(12) United States Patent
Lepiorz et al.

(10) Patent No.: US 11,894,577 B2
(45) Date of Patent: Feb. 6, 2024

(54) POUCH CELL STACK

(71) Applicant: Hilti Aktiengesellschaft, Schaan (LI)

(72) Inventors: Matthias Lepiorz, Chemnitz (DE); Moses Ender, Buchs (CH); Klaus Hauser, Schwabmuenchen (DE); Nora Martiny, Herrsching-Breitbrunn (DE); Bernd Ziegler, Schwabmuenchen (DE); Robert Stanger, Kaufbeuren (DE); Kathrin Sax, Scheuring (DE)

(73) Assignee: Hilti Aktiengesellschaft, Schaan (LI)

( * ) Notice: Subject to any disclaimer, the term of this patent is extended or adjusted under 35 U.S.C. 154(b) by 345 days.

(21) Appl. No.: 17/053,477

(22) PCT Filed: Jun. 7, 2019

(86) PCT No.: PCT/EP2019/064966
§ 371 (c)(1),
(2) Date: Nov. 6, 2020

(87) PCT Pub. No.: WO2019/243086
PCT Pub. Date: Dec. 26, 2019

(65) Prior Publication Data
US 2021/0249741 A1 Aug. 12, 2021

(30) Foreign Application Priority Data
Jun. 21, 2018 (EP) .................................... 18178926

(51) Int. Cl.
*H01M 50/517* (2021.01)
*H01M 50/105* (2021.01)
(Continued)

(52) U.S. Cl.
CPC ....... *H01M 50/517* (2021.01); *H01M 50/105* (2021.01); *H01M 50/211* (2021.01); *H01M 50/503* (2021.01); *H01M 50/54* (2021.01)

(58) Field of Classification Search
CPC ............. H01M 50/517; H01M 50/105; H01M 50/211; H01M 50/503; H01M 50/54; Y02E 60/10
See application file for complete search history.

(56) References Cited

U.S. PATENT DOCUMENTS

2005/0123828 A1* 6/2005 Oogami ................ H01M 50/51
429/152
2005/0260491 A1* 11/2005 Cho ..................... H01M 50/258
429/176

(Continued)

FOREIGN PATENT DOCUMENTS

CN 102754240 A 10/2012
DE 102005042169 A1 3/2007
(Continued)

OTHER PUBLICATIONS

International Search Report of PCT/EP2019/064966, dated Sep. 4, 2019.

*Primary Examiner* — Ula C Ruddock
*Assistant Examiner* — Sarika Gupta
(74) *Attorney, Agent, or Firm* — Davidson, Davidson & Kappel, LLC (57) ABSTRACT

Pouch cell having a positive contact lug and a negative contact lug, in which contact lugs electrical contact can be made with the pouch cell pouch cell and the pouch cell can be charged and discharged in this way, wherein the pouch cell is of planar design and has a flat cell surface which extends parallel in relation to the positive contact lug and the negative contact lug, wherein the positive contact lug has an upper positive connecting element and a lower positive connecting element, which positive connecting elements are arranged on opposite sides of the positive contact lug, and the negative contact lug has an upper negative connecting element and a lower negative connecting element, which (Continued)

negative connecting elements are arranged on opposite sides of the negative contact lug.

19 Claims, 6 Drawing Sheets

(51) Int. Cl.
  *H01M 50/211* (2021.01)
  *H01M 50/54* (2021.01)
  *H01M 50/503* (2021.01)

(56) References Cited

U.S. PATENT DOCUMENTS

| | | |
|---|---|---|
| 2012/0156537 A1 | 6/2012 | Meintschel et al. |
| 2012/0183840 A1 | 7/2012 | Lee et al. |
| 2012/0315531 A1* | 12/2012 | Lev .................... H01M 50/534 |
| | | 429/159 |
| 2016/0056495 A1 | 2/2016 | Mingata et al. |
| 2018/0026294 A1 | 1/2018 | Sauerteig |

FOREIGN PATENT DOCUMENTS

| | | |
|---|---|---|
| DE | 102012209468 A1 | 12/2012 |
| DE | 10 2013011685 A1 | 1/2015 |
| DE | 112014001987 T5 | 12/2015 |
| JP | 2006324353 A | 11/2006 |

* cited by examiner

POUCH CELL STACK

The present invention relates to a pouch cell having a positive contact lug and a negative contact lug, by means of which contact lugs electrical contact can be made with the pouch cell and said pouch cell can be charged and discharged in this way. The pouch cell is of planar design and has a flat cell surface which extends parallel in relation to the positive contact lug and the negative contact lug. The pouch cell preferably has a rechargeable lithium-ion battery.

BACKGROUND

Pouch cells of the kind mentioned at the outset are known in principle from the prior art.

The present invention is based on the object of providing a pouch cell which fosters simple and reliable contact-connection.

SUMMARY OF THE INVENTION

It is an object of the present invention to provide a positive contact lug that has an upper positive connecting element and a lower connecting element, which connecting elements are arranged on opposite sides of the positive contact lug, and the negative contact lug has an upper negative connecting element and a lower negative connecting element, which negative connecting elements are arranged on opposite sides of the negative contact lug.

The invention includes the finding that pouch cells are difficult to handle in mass production processes since their contact lugs are typically situated close to one another and the pouch cells can be short-circuited if they are not handled carefully. Furthermore, it was found that, on account of their construction, pouch cells previously could not be resistance-welded for the purpose of making electrical contact. In mass production processes of battery packs or stacks comprising pouch cells, this leads to a high level of technical and financial expenditure for automated installations which carry out electrical contact-connection of the individual pouch cells.

In return, a pouch cell is created which can be contacted comparatively easily by the connecting elements according to the invention which are provided both on the positive contact lug and on the negative contact lug.

On the basis of the pouch cell which is provided according to the invention, a stack comprising a plurality of pouch cells can be provided. A stack of this kind may be part of a battery pack for supplying power to an electrical handheld power tool. Accordingly, the invention also provides for the use of a stack comprising a plurality of pouch cells according to the invention for supplying power to an electrical handheld power tool.

In this respect, the invention includes the finding that battery packs for electrical handheld power tools are typically manufactured exclusively from cylindrical lithium-ion cells. However, as the power requirement of handheld power tools increases, the discharge currents required increase, as a result of which the battery packs, on account of higher power losses, reach the maximum permissible level before discharge and have to be switched off for temperature-related reasons. The residual energy remaining in the battery pack is not available to users—or is available only after a cooling-down phase.

A stack having a plurality of pouch cells which are contact-connected according to the invention can reduce temperature-related switching off of battery packs for electrical handheld power tools. This is because pouch cells can now be used instead of conventional cylindrical lithium-ion cells. It was found that, on account of their internal electrical design, pouch cells have a lower electrical resistance and therefore exhibit less power loss given comparatively high discharge capacities, as a result of which battery packs comprising pouch cells of this kind can be operated either for longer or at higher powers.

In a particularly preferred refinement, the connecting elements are designed as plug-in connecting elements or screw-type connecting elements. In a further particularly preferred refinement, the connecting elements are designed as plug-in connecting elements, so that, in the course of a mass production process, a plurality of pouch cells can be electrically connected to one another and contact-connected by being plugged in. As an alternative or in addition, the pouch cells can be electrically irreversibly or reversibly connected to one another by pressing or heating.

It has proven to be advantageous when the two positive connecting elements are of the same type, preferably of the female type. As an alternative or in addition, the two negative connecting elements can be of the same, preferably male, type. As an alternative to the refinement of the positive connecting elements and/or the negative connecting elements of the same type, the two positive connecting elements can be of a complementary type in relation to one another and/or the two negative connecting elements can be of a complementary type in relation to one another.

A plug-in connecting element of the female type can be, for example, a plug socket, preferably a plug socket of sleeve-like design. In a manner complementary to this, a plug-in connecting element of the male type is preferably configured as a plug, in particular as a cylindrical plug. In a further preferred refinement, a male plug-in connecting element can have —for example a mechanical latching apparatus such as in the form of a barb —in order to irreversibly connect the male plug-in connecting element to a plug-in connecting element of the female type. A pairing between the female sleeve and the male plug can be form-fitting. A pairing between the female sleeve and the male plug can be designed as a press fit.

It has proven to be advantageous when the connecting elements are electrically conductive at least in sections. The connecting elements, which are designed as plug-in connecting elements, can also be completely electrically conductive.

In a further particularly preferred refinement, the connecting elements each extend perpendicularly in relation to the flat cell surface. The connecting elements can protrude beyond the flat cell surface, perpendicularly in relation to the flat cell surface. Particularly preferably, both the upper connecting elements and the lower connecting elements protrude beyond the flat cell surface, in each case with respect to the vertical direction (parallel in relation to the surface normal) of the flat cell surface.

It has proven to be advantageous when the contact lugs project in the lateral direction from the pouch cell.

In a further preferred refinement, one or more connecting elements can have an inner, preferably coaxially arranged, insulation or passivation. Therefore, short circuits during stacking of the pouch cells can be avoided.

As an alternative or in addition, the pouch cell can be electrically insulated, preferably completely electrically insulated, outside the connecting elements.

The invention is likewise achieved by a stack comprising a plurality of pouch cells of the kind described above, wherein the pouch cells are electrically contact-connected to one another by means of their respective connecting elements.

The invention likewise leads to a method according to the invention for producing a stack with a plurality of pouch cells, wherein a plurality of pouch cells are initially provided, wherein their respective positive contact lug has an upper positive connecting element and a lower positive connecting element and their respective negative contact lug has an upper connecting element and a lower negative connecting element. In a subsequent step, the plurality of pouch cells are electrically contact-connected to one another by means of their respective connecting elements. The contact-making step preferably comprises plugging-in, pressing and/or heating. In the course of stacking, the pouch cells are preferably placed one on the other in a reciprocal manner, that is to say rotated through 180° in each case. In the course of the method according to the invention, the pouch cells can be connected to one another by pressure or heat. As an alternative or in addition, the pouch cells can be screwed to one another. For this purpose, an insulating bushing is preferably provided which extends within the connecting elements and in this way electrically insulates a preferably metal screwing apparatus from the rest of the respective connecting elements.

Further advantages can be found in the following description of the figures. Various exemplary embodiments of the present invention are illustrated in the figures. The figures, the description and the claims contain numerous features in combination. A person skilled in the art will expediently also consider the features individually and combine them to form useful further combinations.

BRIEF DESCRIPTION OF THE DRAWINGS

In the figures, components which are the same and components of the same type are denoted by the same reference signs. In the figures.

DETAILED DESCRIPTION

Figure 1:
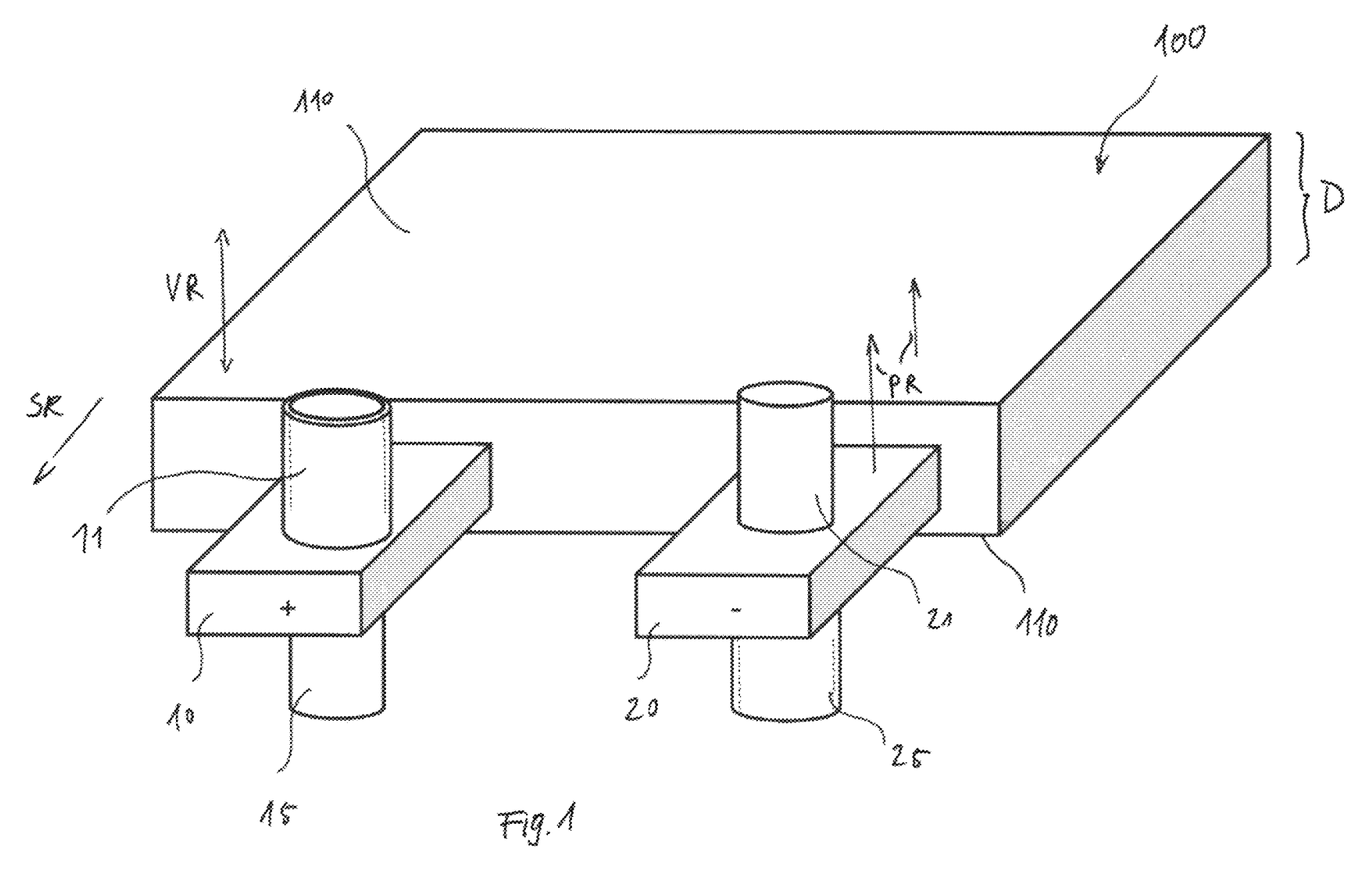
FIG. 1 shows a first preferred exemplary embodiment of a pouch cell according to the invention.

A preferred exemplary embodiment of a pouch cell 100 according to the invention is illustrated in FIG. 1. The pouch cell 100 has a positive contact lug 10 and a negative contact lug 20. Electrical contact is made or can be made with the pouch cell by means of the positive positive contact lug 10 and the negative contact lug 20 and said pouch cell can be charged with current or discharged in this way. The pouch cell 100 is of planar design and has a flat cell surface 110 which extends in the parallel direction PR in relation to the positive contact lug 10 and the negative contact lug 20. The pouch cell 100 from FIG. 1 is of rectangular design, and the thickness D is less than one fifth of a respective side length of the pouch cell 100. In the exemplary embodiment illustrated in the present case, the pouch cell 100 is a rechargeable lithium-ion battery.

As can be gathered from FIG. 1, the positive contact lug 10 has an upper positive connecting element 11 and a lower positive connecting element 15. The upper positive connecting element 11 and the lower positive connecting element 15 are arranged on opposite sides of the positive contact lug. The upper positive connecting element 11 and the lower positive connecting element 15 are formed as plug-in connecting elements of a complementary type. Specifically, the upper positive connecting element 11 is designed as a female plug-in sleeve (inner volume indicated by the dashed line). The lower positive connecting element 15 is designed as a male connector in a complementary manner to said female plug-in sleeve.

It can likewise be clearly seen in FIG. 1 that the negative contact lug 20 has an upper negative connecting element 21 or a lower negative connecting element 25. The upper negative connecting element 21 and the lower negative connecting element 25 are arranged on opposite sides of the negative contact lug. Just like the connecting elements 11, 15 of the positive contact lug 10, the connecting elements 21, 25 of the negative contact lug 20 are designed as plug-in connecting elements. In this case, the negative connecting elements 21, 25 are of a complementary type in relation to one another. More specifically, the upper negative connecting element is formed as a male plug-in connecting element and the lower negative connecting element 25 is formed as a plug-in connecting element of the female type in the form of a sleeve.

Connecting elements 11, 15, 21, 25 are each electrically conductive, wherein the upper positive connecting element 11 and the lower positive connecting element 15 are electrically connected to the positive contact lug 10 (positive pole). The upper negative connecting element 21 and the lower negative connecting element 25 are electrically electrically connected to the negative contact lug 20 (negative pole). Therefore, electrical contact can be made with the pouch cell 100 by means of the connecting elements 11, 15, 21, 25.

As can likewise be gathered from FIG. 1, the connecting elements 11, 15, 21, 25 each extend in a vertical direction VR in relation to the flat cell surface 110. In this case, the connecting elements 11, 15, 21, 25 each protrude beyond the flat cell surface 110 in the vertical direction VR in relation to the flat cell surface 110. In other words, the upper positive connecting element 11 and the upper negative connecting element 21 project upward beyond the thickness D of the pouch cell 100 beyond the flat cell surface 110. The lower positive connecting element 15 and the lower negative connecting element 25 protrude beyond the thickness D of the pouch cell 100 in the opposite direction.

The contact lugs 10, 20 as the respective carriers of the connecting elements 11, 15, 21, 25 for their part project from the pouch cell in the lateral direction SR.

In the exemplary embodiment illustrated in the present case, the pouch cell 100 is electrically insulated outside the connecting elements 11, 15, 21, 25 in order to avoid short circuits.

Figure 2:
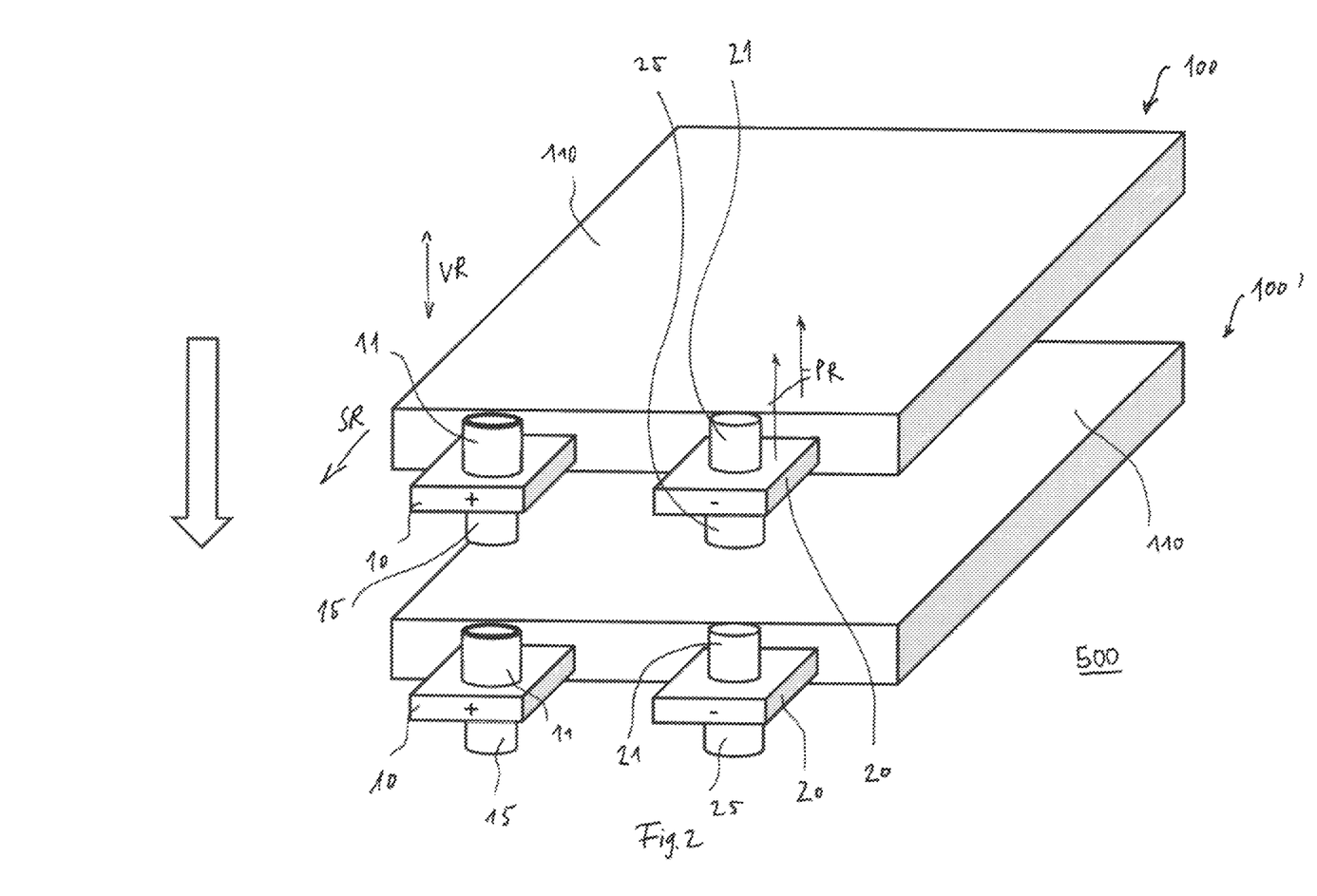
FIG. 2 shows two pouch cells from FIG. 1 in the course of electrical contact-connection.

FIG. 2 now shows two pouch cells 100, 100' of the same type, more precisely two pouch cells 100 according to the exemplary embodiment from FIG. 1. The two pouch cells 100, 100' are arranged one above the other with the same orientation and are not yet connected to one another. The two pouch cells 100, 100' can be connected by being joined in the direction of the thick arrow. In the course of this joining operation, the male, lower positive connecting element 15 of the upper pouch cell 100 is plugged into the upper positive connecting element 11 of the lower pouch cell 100'. As a result, the respective positive contact lugs 10 of the pouch cells 100, 100' are electrically contact-connected to one another.

At the same time, the lower negative connecting element 25 of the upper pouch cell 100 (of female design) is placed onto the upper negative connecting element 21 of the lower pouch cell 100'. In this way, the respective negative contact lugs 20 of the upper and the lower pouch cell 100, 100' are contact-connected.

A stack 500 which is connected in parallel is formed by joining the pouch cells 100, 100' shown in FIG. 2. In the exemplary embodiment illustrated in FIG. 2, the male connecting elements 15, 21 have a press fit with the female connecting elements 11, 25. Since the connecting elements 11, 15, 21, 25 are of electrically conductive design in the present case, plugging together the pouch cells 100, 100' achieves both electrical contact-connection and mechanical connection of the pouch cells 100, 100'. In the vertical direction VR, the pouch cells 100, 100' are therefore connected to one another in a frictional manner. In the lateral direction SR, the connecting elements 11, 15, 21, 25 are form-fitted to one another.

In a variant not shown further here, the connecting elements 11, 15, 21, 25 can also be manufactured from an electrically conductive plastic, wherein in this case the connecting elements 11, 15, 21, 25, after being plugged together, can be connected to one another in a form-fitting manner by heating or welding. Welding can be carried out, for example, by means of ultrasonic welding.

As can be gathered from FIG. 2, the connecting elements 11, 15, 21, 25 which are designed as plug-in connecting elements are already arranged on the pouch cells 100, 100' before said pouch cells are stacked. As an alternative —this is however more complex and not shown here —the pouch cells 100, 100' can first be stacked and then equipped with the respective connecting elements 11, 15, 21, 25.

Figure 3:
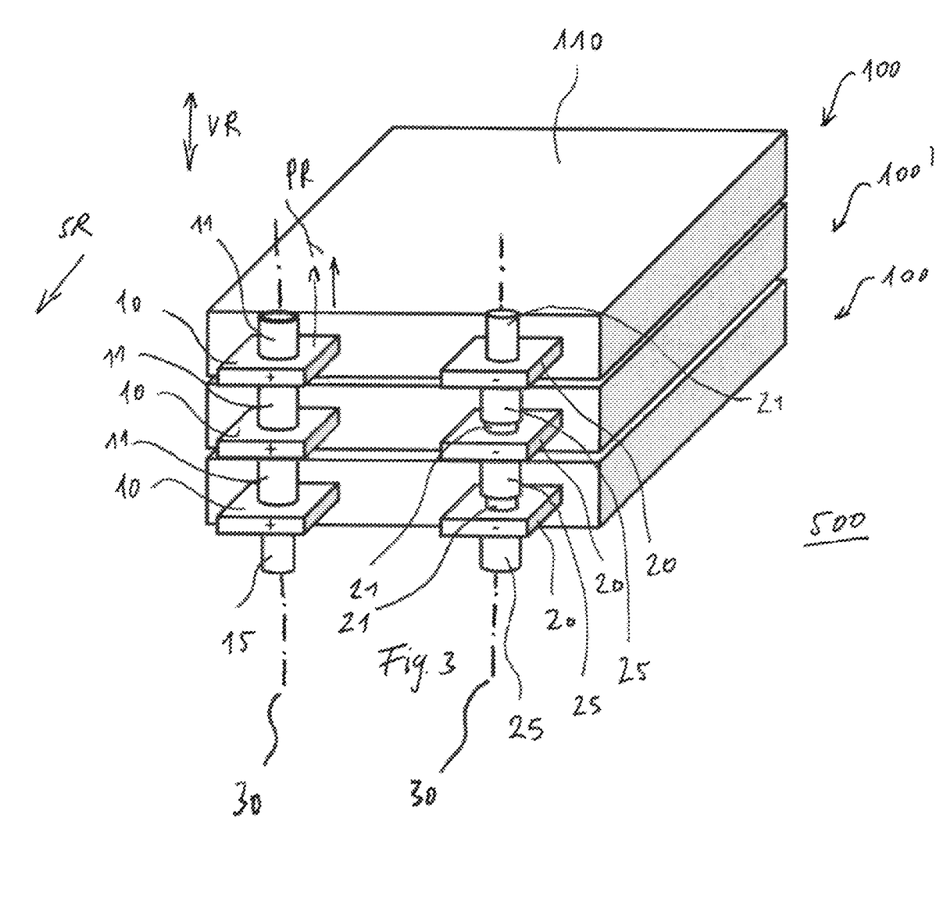
FIG. 3 shows a stack having three pouch cells from FIG. 1.

FIG. 3 finally shows a stack 500 which is connected in parallel and comprises three pouch cells 100, 100', 100", wherein firstly the respective positive contact lugs 10 are contact-connected to one another and secondly the respective negative contact lugs 20 are electrically contact-connected to one another and are mechanically connected to one another. As can be gathered from FIG. 3, the respective positive contact lugs 10 and the negative contact lugs 20 protrude from one and the same side of the pouch cells 100, 100', 100" in the lateral direction SR.

Figure 4:
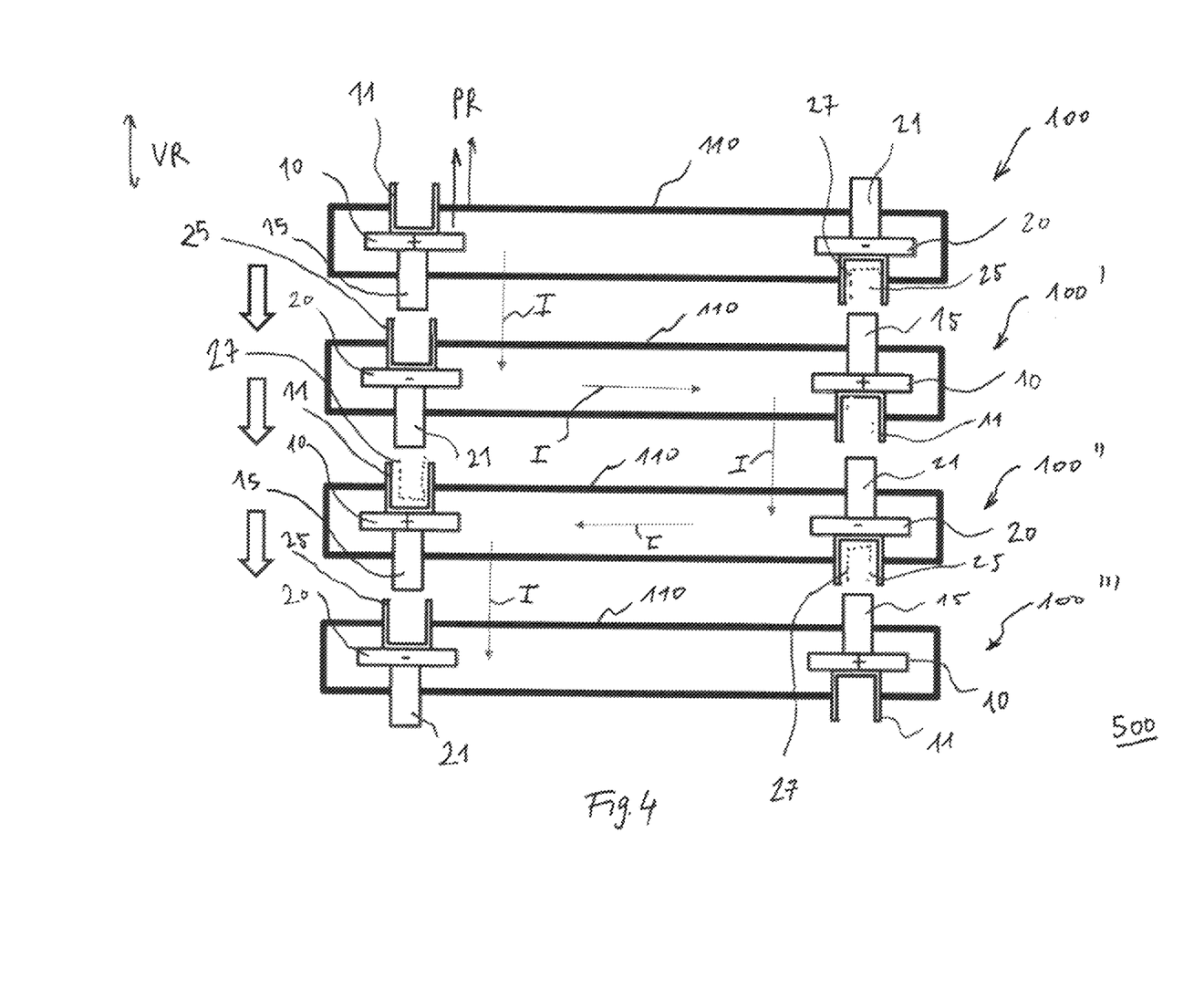
FIG. 4 shows a side view of an alternative stack having a plurality of pouch cells.

FIG. 4 shows a total of four pouch cells 100, 100', 100", 100''' which are to be connected to form a stack which is connected in series. In this case, the pouch cells 100 to 100''' are pouch cells of the same type as illustrated in FIG. 1. In contrast to the stacking described with reference to FIG. 2, the pouch cells 100 to 100''' are placed one on the other in a reciprocal manner. In other words, the upper positive connecting element 11 is on top in the first pouch cell 100 and the third pouch cell 100". The upper positive connecting elements 11 are each arranged at the bottom right (position in FIG. 4) in the second pouch cell 100' and the fourth pouch cell 100'''. In other words, respectively adjacent pouch cells are rotated through 180° in relation to one another.

In order to avoid an electrical short circuit between two adjacent pouch cells, the lower negative connecting element 25 (female) of the first pouch cell 100, the upper positive connecting element 11 and the lower negative connecting element 25 (each female) of the third pouch cell 100" for example have an insulation 27 provided in the form of a sleeve which is arranged coaxially in the respective connecting element 25, 11.

The current flow I through the stack 500 which is then connected in series is represented by the corresponding arrows.

Figure 5:
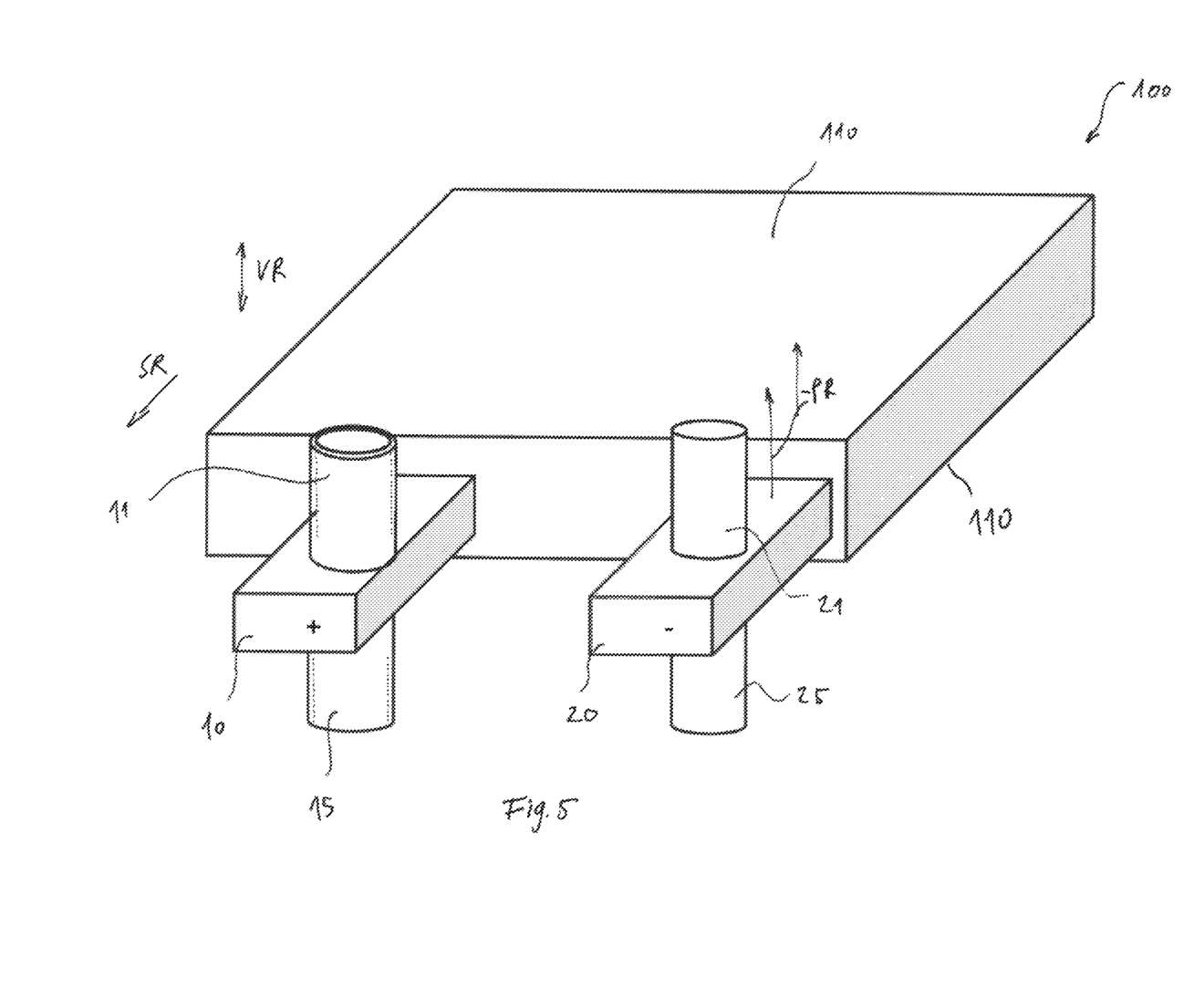
FIG. 5 shows a second preferred exemplary embodiment of a pouch cell according to the invention.

FIG. 5 finally shows a pouch cell 100 of an alternative type. In contrast to the exemplary embodiment described with FIG. 1, the two positive connecting elements 11, 15, which are each electrically connected to the positive contact lug 10, are of different types. In the exemplary embodiment shown in the present case, the two positive connecting elements 11, 15 are of the female type.

As can likewise be gathered from FIG. 5, the negative connecting elements 21, 25 which are electrically connected to the negative contact lug 20 are of the same type, more precisely of the male type by way of example. The positive connecting elements 11, 15 are of complementary design in relation to the negative connecting elements 21, 25.

As in the exemplary embodiment from FIG. 1, the connecting elements 11, 15, 21, 25 each extend in the vertical direction VR in relation to the flat cell surfaces 110 on the top and the bottom side of the pouch cell 100. In this case, the connecting elements 11, 15, 21, 25 protrude beyond the respectively flat cell surfaces 110 in the vertical direction VR. Electrical contact is also made with the pouch cell 100 from FIG. 5 only on one side, here on the front side by way of example.

Figure 6:
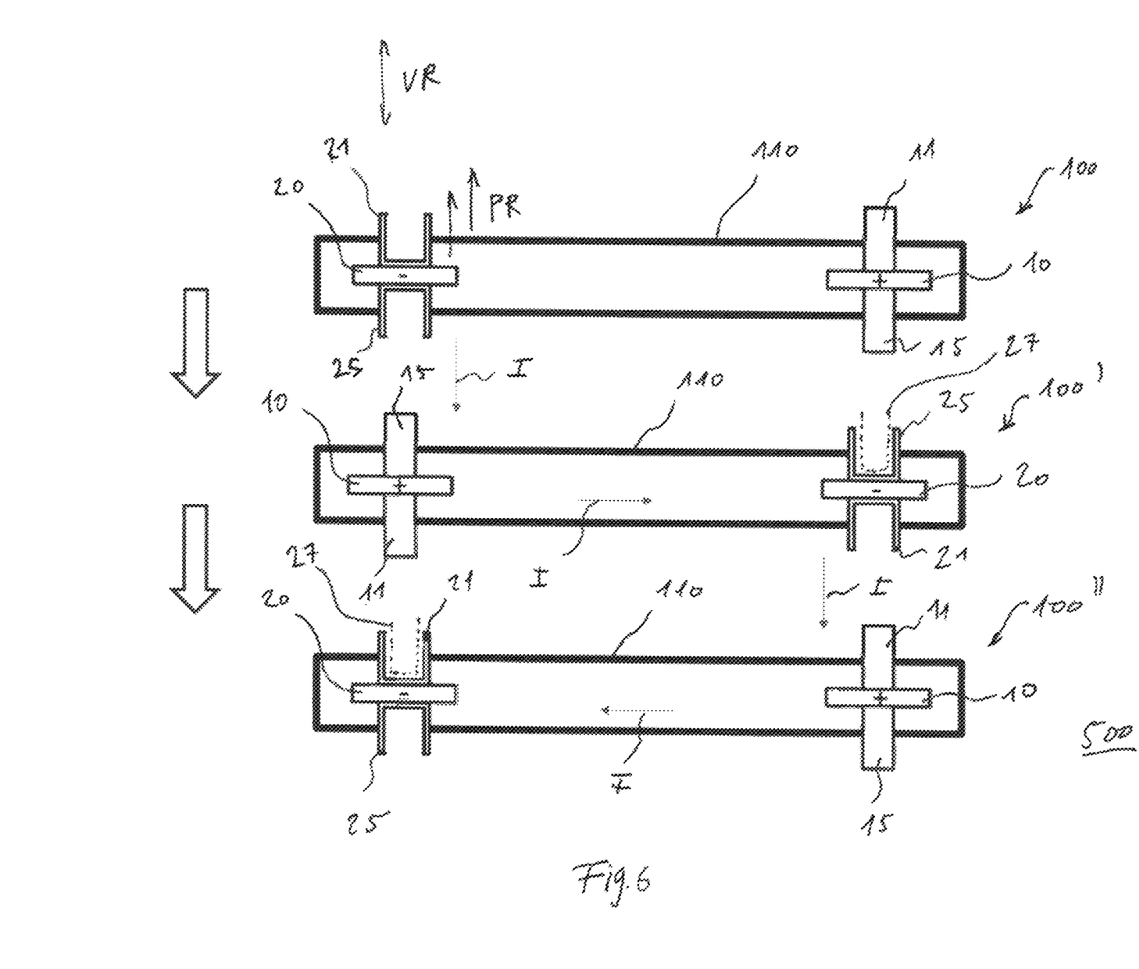
FIG. 6 shows a stack having three pouch cells of a third preferred exemplary embodiment.

FIG. 6 shows the arrangements of three pouch cells 100, 100', 100" before they are electrically contact-connected. The three pouch cells 100, 100', 100" each have positive connecting elements 11, 15 of the same type and negative connecting elements 21, 25 of the same type. Wherein the positive connecting elements 11, 15 are formed in a complementary manner in relation to the negative connecting elements 21, 25. In contrast to the pouch cell 100 described with reference to FIG. 5, the polarities of the pouch cells 100, 100', 100" from FIG. 6 are interchanged. That is to say, in FIG. 6, the negative contact lug 20 is in each case the carrier of the negative connecting elements 21, 25 of female design.

In order to avoid electrical short-circuiting during stacking, the lower negative connecting element 25 of the second pouch cell 100' and the upper negative connecting element 21 of the third pouch cell 100" must each have an insulation 27 which is designed as a sleeve which is arranged coaxially in relation to the respective connecting element. In the connected state (pressing together in the thick arrow direction), a stack 500 which is connected in series is formed from the individual pouch cells 100, 100', 100" from FIG. 6.

The stack 500 from FIG. 3 is secured, by way of example, by two screw connections 30 in a form-fitting manner in the vertical direction VR too. In this case, the screw connections 30 each run coaxially through the positive connecting elements 11, 15 or through the negative connecting elements 21, 25. In this case, care must be taken to electrically insulate this bushing. This can be achieved, for example, by an additionally provided insulating sleeve which runs through the respective connecting elements 11, 15, 21, 25. As an alternative or in addition, a screwed connection can be made by means of an electrically insulating plastic screw. Two screw connections 30 are illustrated in FIG. 3 by way of example. A screw connection is likewise conceivable only through the positive connecting elements 11, 15 or the negative connecting elements 21, 25.

LIST OF REFERENCE SIGNS

10 Positive contact lug
11 Upper positive connecting element

15 Lower positive connecting element
20 Negative contact lug
21 Upper negative connecting element
25 Lower negative connecting element
27 Insulation
30 Screw connection
100 . . . 100'''' Pouch cell
110 Flat cell surface
500 Stack
D Thickness
I Current flow
PR Parallel direction
SR Lateral direction
VR Vertical direction

What is claimed is:

1. A pouch cell comprising:
a positive contact lug; and
a negative contact lug, by means of which contact lugs electrical contact capable of being with the pouch cell via the negative and positive contact lugs to charge and discharge the pouch cell,
the pouch cell being of planar design and having a flat cell surface extending parallel in relation to the positive contact lug and the negative contact lug;
the positive contact lug having an upper positive connecting element and a lower positive connecting element, the upper and lower positive connecting elements being arranged to extend perpendicularly on opposite sides of the positive contact lug;
the negative contact lug having an upper negative connecting element and a lower negative connecting element, the upper and lower negative connecting elements being arranged on opposite sides of the negative contact lug;
wherein the upper positive, lower positive, upper negative and lower negative connecting elements are designed as plug-in connecting elements or screw-type connecting elements.

2. The pouch cell as recited in claim 1 wherein the upper and lower positive connecting elements are of a same type or the upper and lower negative connecting elements are of the same type or another same type.

3. The pouch cell as recited in claim 2 wherein the upper and lower positive connecting elements are female connecting elements and the upper and lower negative connecting elements are male connecting elements.

4. The pouch cell as recited in claim 1 wherein the upper and lower positive connecting elements are of a complementary type to each other or the upper and lower negative connecting elements are of the complementary type to each other.

5. The pouch cell as recited in claim 1 wherein the upper positive, lower positive, upper negative and lower negative connecting elements are electrically conductive at least in sections.

6. The pouch cell as recited in claim 1 wherein the upper positive, lower positive, upper negative and lower negative connecting elements each extend perpendicularly in relation to the flat cell surface.

7. The pouch cell as recited in claim 1 wherein the upper positive, lower positive, upper negative and lower negative connecting elements protrude beyond the flat cell surface, perpendicularly in relation to the flat cell surface.

8. The pouch cell as recited in claim 1 wherein the positive and negative contact lugs project in a lateral direction of the pouch cell.

9. The pouch cell as recited in claim 1 wherein at least one of the upper positive, lower positive, upper negative and lower negative connecting elements have an inner, preferably coaxially arranged, insulation or passivation.

10. The pouch cell as recited in claim 1 wherein at least one of the upper positive, lower positive, upper negative and lower negative connecting elements have an inner coaxially arranged insulation.

11. The pouch cell as recited in claim 1 wherein the pouch cell is electrically insulated to the outside except for the upper positive, lower positive, upper negative and lower negative connecting elements.

12. The pouch cell as recited in claim 11 wherein the pouch cell is completely electrically insulated to the outside except for the upper positive, lower positive, upper negative and lower negative connecting elements.

13. A stack comprising a plurality of pouch cells as recited in claim 1, wherein the plurality of pouch cells are electrically contact-connected to one another via respective upper positive, lower positive, upper negative and lower negative connecting elements.

14. A method for using the stack as recited in claim 13 comprising supplying power to an electrical handheld power tool.

15. The pouch cell as recited in claim 1 wherein the opposite sides include a first side and a second side parallel to the flat cell surface.

16. The pouch cell as recited in claim 15 wherein the flat cell surface is a largest surface of the pouch cell.

17. The pouch cell as recited in claim 15 wherein the positive contact lug is a rectangular parallelepiped.

18. The pouch cell as recited in claim 15 wherein the upper positive connecting element and the lower positive connecting element extend perpendicularly to the flat cell surface.

19. The pouch cell as recited in claim 18 wherein the flat cell surface is a largest surface of the pouch cell.

* * * * *